United States Patent
Giwnewer et al.

(10) Patent No.: US 10,310,265 B2
(45) Date of Patent: Jun. 4, 2019

(54) DEVICE, METHOD, AND SYSTEM OF PROVIDING EXTENDED DISPLAY WITH HEAD MOUNTED DISPLAY

(71) Applicants: INTEL CORPORATION, Santa Clara, CA (US); Yair Giwnewer, Tal El (IL); Tomer Rider, Naahryia (IL); Aviv Ron, Klachim (IL); Yevgeniy Kiveisha, Bney Aish (IL); Minghao Jiang, Shanghai (CN)

(72) Inventors: Yair Giwnewer, Tal El (IL); Tomer Rider, Naahryia (IL); Aviv Ron, Klachim (IL); Yevgeniy Kiveisha, Bney Aish (IL); Minghao Jiang, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/039,405

(22) PCT Filed: Dec. 27, 2013

(86) PCT No.: PCT/CN2013/090728
§ 371 (c)(1),
(2) Date: May 25, 2016

(87) PCT Pub. No.: WO2015/096145
PCT Pub. Date: Jul. 2, 2015

(65) Prior Publication Data
US 2017/0168296 A1    Jun. 15, 2017

(51) Int. Cl.
*G02B 27/01* (2006.01)
*G02B 27/02* (2006.01)
(Continued)

(52) U.S. Cl.
CPC ............ *G02B 27/017* (2013.01); *G02B 27/02* (2013.01); *G06F 1/00* (2013.01); *G06F 3/011* (2013.01);
(Continued)

(58) Field of Classification Search
CPC .................. G02B 27/017; G02B 27/02; G02B 2027/0138; G02B 2027/014;
(Continued)

(56) References Cited

U.S. PATENT DOCUMENTS

2003/0012410 A1   1/2003  Navab
2003/0030597 A1   2/2003  Geist
(Continued)

FOREIGN PATENT DOCUMENTS

CN    101029968 A    9/2007
CN    102419631 A    4/2012
(Continued)

OTHER PUBLICATIONS

PCT Notification of Transmittal of the International Search Report and the Written Opinion of the International Searching Authority, or the Declaration for PCT Counterpart Application No. PCT/CN2013/090728, 13 pp., (dated Sep. 29, 2014).
(Continued)

*Primary Examiner* — Mark W Regn
(74) *Attorney, Agent, or Firm* — Womble Bond Dickinson (US) LLP

(57) ABSTRACT

A head mounted display for displaying computer-generated information in conjunction with a physical display of a computer system is provided. The head mounted display includes a generation logic, a see through display, and a presentation unit. The generation logic is used to generate at least one virtual display. The presentation unit is used to present the at least one virtual display on the see-through
(Continued)

display. The see-through display is configured to enable a user of the head mounted display to view the at least one virtual display and the physical display in a real-world scene. The at least one virtual display is presented on the see-through display as an additional object in the real-world scene, and the at least one virtual display is used in conjunction with the physical display to present the computer-generated information in an extended desktop from a visual perspective of the user.

18 Claims, 6 Drawing Sheets

(51) Int. Cl.
 *G06F 1/00* (2006.01)
 *G06F 3/01* (2006.01)
(52) U.S. Cl.
 CPC .............. *G06F 3/012* (2013.01); *G06F 3/013* (2013.01); *G02B 2027/014* (2013.01); *G02B 2027/0138* (2013.01); *G02B 2027/0178* (2013.01); *G02B 2027/0187* (2013.01)
(58) Field of Classification Search
 CPC .... G02B 2027/0178; G02B 2027/0187; G06F 1/00; G06F 2/011; G06F 2/012; G06F 2/013
 USPC .............................................................. 345/8
 See application file for complete search history.

(56) References Cited

U.S. PATENT DOCUMENTS

2010/0208033 A1   8/2010   Edge et al.
2013/0141421 A1   6/2013   Mount et al.
2013/0187835 A1   7/2013   Vaught

FOREIGN PATENT DOCUMENTS

| CN | 102999160 A | 3/2013 |
| CN | 103149689 A | 6/2013 |
| JP | 1998240491 A | 9/1998 |
| JP | 2007-097902 A | 4/2007 |
| JP | 2009245390 A | 10/2009 |
| JP | 2010-151997 A | 7/2010 |
| JP | 2012-233963 A | 11/2012 |
| JP | 2012220602 A | 11/2012 |
| JP | 2012233962 A | 11/2012 |
| JP | 2012233963 * | 11/2012 |
| WO | WO 2011/121949 A1 | 10/2011 |

OTHER PUBLICATIONS

Korean Patent Office, Notice of Preliminary Rejection (Office Action) dated May 18, 2017, for counterpart Korean Patent Application No. 2016-7104007, 5 pages.
International Preliminary Report on Patentability received for PCT Patent Application No. PCT/CN2013/090728, dated Jul. 7, 2016, 7 pages.
First Office Action for counterpart Chinese Patent Application No. 201380081244.0, 9 pgs. (dated Jun. 28, 2017).
Extend European Search Report for Counterpart EP Patent Application No. 13900109.3-1972, 7 pgs. (dated Jun. 30, 2017).
First Office Action for counterpart Japanese Patent Application No. 2016-542702 with English translation, 9 pgs., (dated Aug. 29, 2017).
First Office Action for counterpart Russian Patent Application No. 2016120976 with English translation, 10 pgs. (dated Jul. 7, 2017).

* cited by examiner

DEVICE, METHOD, AND SYSTEM OF PROVIDING EXTENDED DISPLAY WITH HEAD MOUNTED DISPLAY

CROSS-REFERNCE TO RELATED APPLICATIONS

This patent application is a U.S. National Phase Application under 35 U.S.C. § 317 of International Application No. PCT/CN2013/090728, filed Dec. 27, 2013, entitled DEVICE, METHOD, AND SYSTEM OF PROVIDING EXTENED DISPLAY WITH HEAD MOUNTED DISPLAY.

FIELD

Embodiments described herein generally relate to displaying information with a multi-display system, and more particularly, to displaying information with a multi-display system comprised of a head mounted display that is to be used in conjunction with a physical display of the system.

BACKGROUND

Computer-generated information refers to information that is generated, processed, or both by a desktop or portable computer system. A physical display is a tangible computer output surface and projecting mechanism that shows computer-generated information, such as text, videos, and graphic images, to a computer system user, using a cathode ray tube (CRT), liquid crystal display (LCD), light-emitting diode, gas plasma, or other image projection technology.

A multi-display system is a system that uses at least two physical displays to show computer-generated information to a user. In particular, the multi-display system causes the multiple physical displays to work together to simulate a single physical display, called an extended desktop. A multi-display system can show a user more computer-generated information than a conventional single-display system by offering an increased display area. The advantages of multi-display systems include allowing users to increase their work efficiency by providing an increased display area that reduces clutter and improves multi-tasking.

Typically, the use of multi-display systems is limited to a small subset of fixed locations because the two or more physical displays are not capable of being easily carried or transported. There are some multi-display systems with two or more physical displays that offer portability to users, however, the portability remains sub-optimal. In addition, some multi-display systems require the expenditure of large amounts of resources by users. For example, the use of multi-display systems with numerous physical displays (e.g., ranging from tens to thousands of 15-inch LCDs) requires a sizeable amount of room and energy.

Users of desktop computer systems, as well as users working on portable computer systems, such as laptops, notebooks, hand-held devices, and mobile phones, have several options that allow for the deployment of more than one display. Nevertheless, the suboptimal portability described above, as well as the sizeable costs associated with using multi-display systems, continue to persist.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
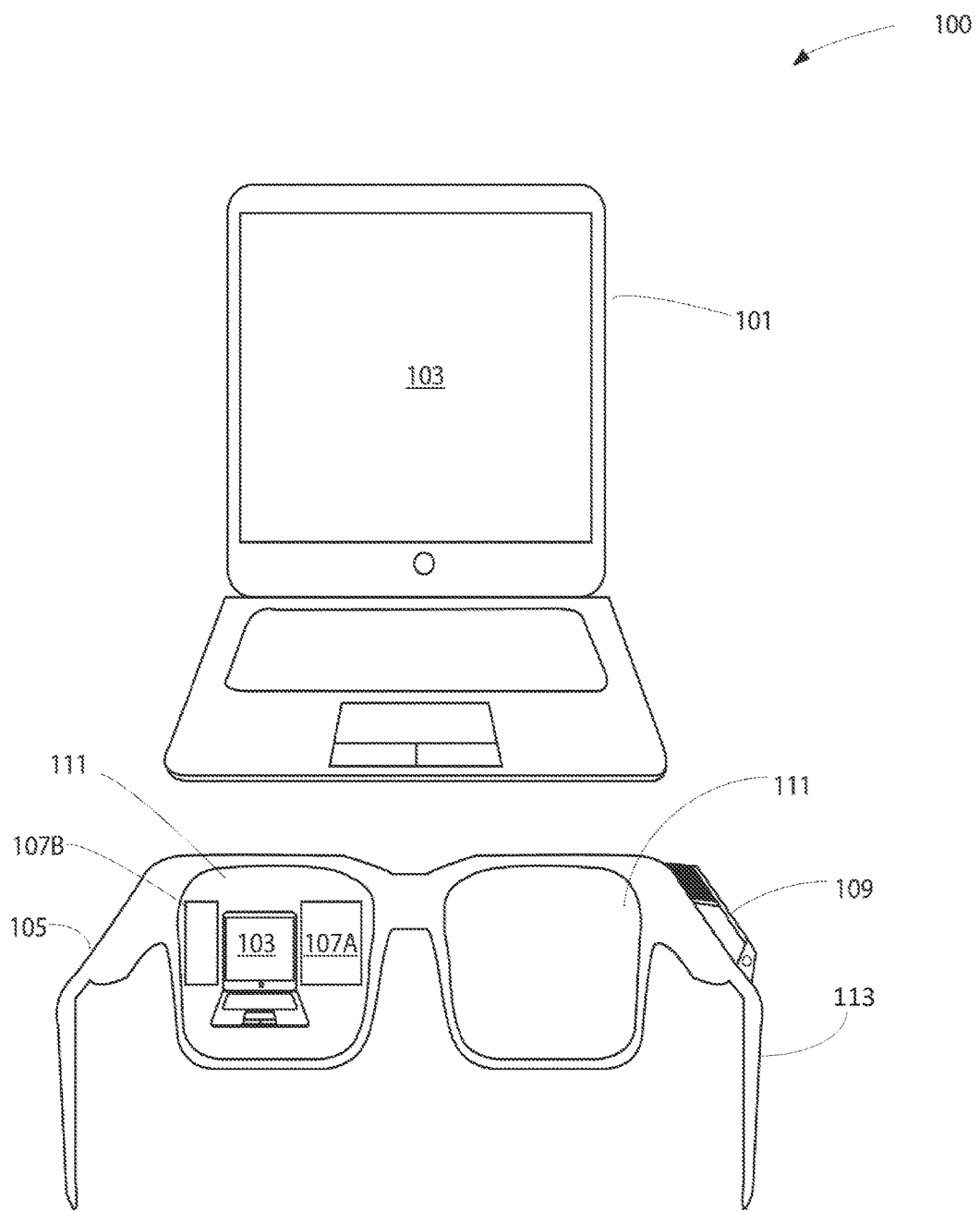
FIG. 1 is an illustration of an exemplary multi-display system with at least one physical display and at least one virtual display that is provided by a head mounted display.

Embodiments described herein show computer-generated information to a user using a multi-display system that includes a physical display and at least one virtual display that is provided by a head mounted display.

For an exemplary embodiment, a head mounted display for displaying computer-generated information in conjunction with a physical display of a computer system is provided. The head mounted display includes a generation logic, a see through display, and a presentation unit. The generation logic is used to generate at least one virtual display. The presentation unit is used to present the at least one virtual display on the see-through display. The see-through display is configured to enable a user of the head mounted display to view the at least one virtual display and the physical display in a real-world scene. The at least one virtual display is presented on the see-through display as an additional object in the real-world scene, and the at least one virtual display is used in conjunction with the physical display to present the computer-generated information in an extended desktop from a visual perspective of the user.

An advantage of one or more embodiments of a multi-display system that includes a physical display and at least one virtual display that is provided by a head mounted display is a solution to the reduced portability and increased resource consumption associated with traditional multi-display systems that employ two or more physical displays.

The term "computer-generated information," as used herein, refers to the information that is generated and/or processed by a computer system.

The term "desktop," as used herein, refers to a human interface environment through which users can launch, interact with, and manage applications, settings, and/or data, etc. Desktops are used to present computer-generated information to users of computer systems. The term "extended desktop," as used herein, refers to a single desktop that spans more than one physical and/or virtual display.

The term "physical display," as used herein, refers to a computer output and projecting mechanism that shows computer-generated information, such as text, videos, and graphic images, on a desktop to a computer system user, using a cathode ray tube (CRT), liquid crystal display (LCD), light-emitting diode (LED), organic light-emitting diode (OLED), Liquid crystal on silicon (LCOS), gas plasma, retinal projection, or other image projection technology.

The term "virtual display," as used herein, refers to a virtual object made of computer graphics that mimics the appearance and behavior of a physical display. A virtual display operates as a desktop with which an end user can interact using software and/or hardware of a computer system and/or a head mounted display.

The term "see-through display," as used herein, includes reference to a physical display that allows a user to see what is shown on the display while still enabling the user to see through the display. A see-through display can be a transparent or semi-transparent display that utilizes image projection technology, such as CRT, LCD, LED, OLED, LCOS, gas plasma, retinal projection technology, or other image projection technology. The term "see-through display," as used herein, can also refer to a lens or a piece of glass, plastic, or other transparent substance that is placed directly on or in front of a human eye, and is used for concentrating, modifying, projecting, or dispersing light rays. The term "see-through display," as used herein, can also refer to a lens or a piece of glass, plastic, or other transparent substance that is placed directly on or in front of a human eye that contains combinations and/or variations of transparent or semi-transparent displays (described above) that utilize image projection technology.

The term "head mounted display" refers to a wearable device that has the capability of presenting computer-generated information (such as images and/or videos) to a user, as well as the capability of allowing the user to see through it. Head mounted displays are used to present virtual objects to users, while also granting users with the capability of viewing scenes in the real world. Head mounted displays present computer-generated information to users in at least three different ways. One type of head mounted display includes a projector that projects computer-generated information onto one or two semi-transparent lenses that are placed in front of a user's eyes. A second type of head mounted display includes one or two lenses that are placed in front of a user's eyes, and that contain semi-transparent physical displays in the lenses for presenting computer-generated information to the user. The semi-transparent physical displays that are included in this type of head mounted display include CRT, LCD, LED, OLED, LCOS, gas plasma, or other image projection technology. Other types of head mounted displays include head mounted displays that present computer-generated information using at least one of direct retinal projection technology, a magnifier, and an optical relay lens, depending on the optical system configuration.

Head mounted displays can be worn on a user's head or as part of a helmet worn by the user. Head mounted displays that have a display optic in front of one eye are known as monocular head mounted displays, and head mounted displays that have a display optic in front of each eye are known as binocular head mounted displays. Head mounted displays allow virtual objects to be superimposed on a real-world scene. This is sometimes referred to as augmented reality or mixed reality. Combining a user's view of the real world with virtual objects, in real time, can be done by presenting the virtual objects through semi-transparent physical displays that are capable of allowing a user to view the virtual objects and the real world simultaneously. This method is often called Optical See-Through, and the types of head mounted displays that employ this method are called optical head mounted displays. Combining a user's view of the real world with virtual objects, in real time, can also be done electronically by accepting video from a camera and mixing it electronically with virtual objects. This method is often called Video See-Through, and the types of head mounted displays that employ this method are called video head mounted displays.

FIG. 1 illustrates an exemplary multi-display system 100 with physical display 103 and at least one virtual display 107A-B. Head mounted display 105 is worn by a user, and used in conjunction with computer system 101. More specifically, physical display 103 is connected to computer system 101 and is used to present computer-generated information to a user in conjunction with head mounted display 105. Head mounted display 105 provides at least one virtual display 107A-B that works together with physical display 103 to present computer-generated information to the user in an extended desktop. In particular, head mounted display 105 includes logic housing 109, see-through display 111, and frame 113. Logic housing 109 and see-through display 111 are used to generate and present at least one virtual display 107A-B, respectively. Frame 113 is used to hold see-through display 111 and logic housing 109. Frame 113 can be made of any plastic, metal, or other material that is sturdy enough to hold see-through display 111 and logic housing 109. For some embodiments, frame 113 is also made of a material that provides electronic and/or magnetic connections between see-through display 111 and logic housing 109.

Logic housing 109 of FIG. 1 houses several logical units that are used to generate, configure, and present at least one virtual display 107A-B for use in conjunction with physical display 103 to present computer-generated information to a user of head mounted display 105. Logic housing 109 includes a generation logic (not shown) and a presentation unit (not shown).

The generation logic that is housed by logic housing 109 can be a graphics processing unit (GPU) or other circuitry that performs and executes graphics rendering. For example, and not by way of limitation, the generation logic inside logic housing 109 is a GPU that uses the positional information (described below), the screen area (described below), and the surface position (described below) of physical display 103 to render and generate at least one virtual display 107A-B. Generated virtual displays 107A-B are computer-graphics representations of physical display 103. For one embodiment, virtual displays 107A-B are generated by the generation logic inside logic housing 109 based on the positional information, the screen area, and the surface position of the physical display determined by a calculation logic that can also be found inside logic housing 109 (described below).

See-through display 111 of FIG. 1 is used, in conjunction with a presentation unit, by head mounted display 105 to present at least one virtual display 107A-B that is generated by the generation logic inside logic housing 109 to a user of head mounted display 105. See through display 111 presents at least one virtual display 107A-B to the user, while also allowing the user to view physical display 103. At least one of virtual displays 107A-B acts in concert with physical display 103 to present computer-generated information from computer system 101 in an extended desktop. This extended desktop is a single desktop that spans virtual displays 107A-B and physical display 103.

As discussed above, logic housing 109 of FIG. 1 also includes a presentation unit. The presentation unit of logic housing 109 can be hardware, or software, or a combination thereof. The presentation unit of logic housing 109 is used coalesce all the data from the other logical units that reside in logic housing 109, and to create the final visual representation of at least one of virtual displays 107A-B and the computer-generated information from the coalesced data. The final visual representation of virtual displays 107A-B and the computer-generated information that is created by the presentation unit is presented to a user of head mounted display 105 on see-through display 111.

For example, and not by way of limitation, the presentation unit of logic housing 109 can be a projector that projects at least one visual display 107A-B on a see-through display 111 that is made of a lens or a piece of glass, plastic, or other transparent substance that is placed directly on or in front of a human eye, and is used for concentrating, modifying, projecting, or dispersing light rays. In this example, the projected virtual displays 107A-B are generated by the generation logic inside logic housing 109.

For an additional non-limiting example, the presentation unit of logic housing 109 can be a display controller that processes at least one of the virtual displays that are generated by the generation logic of logic housing 109, and outputs the processed results using a see-through display 111, such as a virtual retinal display (VRD), a retinal scan display (RSD) or a retinal projector (RP), to display at least one of the generated virtual displays directly onto the retina of the eye of a user of head mounted display 105.

For another non-limiting example, the presentation unit can be a video display controller (VDC) that processes the generated virtual displays 107A-B of the generation logic of logic housing 109 and uses the processed results to output frame buffers on see-through display 111 so that a user of head mounted display 105 is presented with a visual representation of virtual displays 107A-B. For yet another non-limiting example, the presentation unit can be a video display processor (VDP) that processes at least one of the generated virtual displays 107A-B of the generation logic of logic housing 109 and uses that processed information to output a visual representation of the at least one of visual displays 107A-B to be shown to a user of head mounted display 105 on see-through display 111. For an alternative example, the presentation unit of logic housing 109 can be a video signal generator that outputs the visual representation of at least one of virtual displays 107A-B to see-through display 111 for presentation of computer-information to a user of head mounted display 105.

For some embodiments, at least one virtual display 107A-B is presented on see-through display 111 to the user wearing head mounted display 105 as an additional object, from a visual perspective of the user, in a real-world scene being viewed by the user. For these embodiments, physical display 103 is located in the real-world scene being viewed by the user. For example, at least one virtual display 107A-B can be presented on see-through display 111 as an additional object that is adjacently located to physical display 103 in the real-world scene from a visual perspective of the user. Alternatively, at least one virtual display 107A-B can be presented on see-through display 111 as an additional object that is superimposed over physical display 103 in the real-world scene from a visual perspective of the user.

For some embodiments, the computer-generated information is shown in an extended display on at least one virtual display 107A-B and physical display 103, to the user, only while physical display 103 is in a field of view of head mounted display 105. For these embodiments, the field of vision of head mounted display 105 can be determined by at least one of an accelerometer, a digital compass, a visual camera, an infra-red camera, and other physical sensor suitable for gathering data and/or measuring parameters relating to a physical manipulation and/or orientation context of head mounted display 105 and/or physical display 103. For other embodiments, physical display 103 will be determined to be in the field of vision of head mounted display 105 after the positional information, the surface location, and the screen area of physical display 103 have been determined by a calculation logic (described below).

Figure 2:
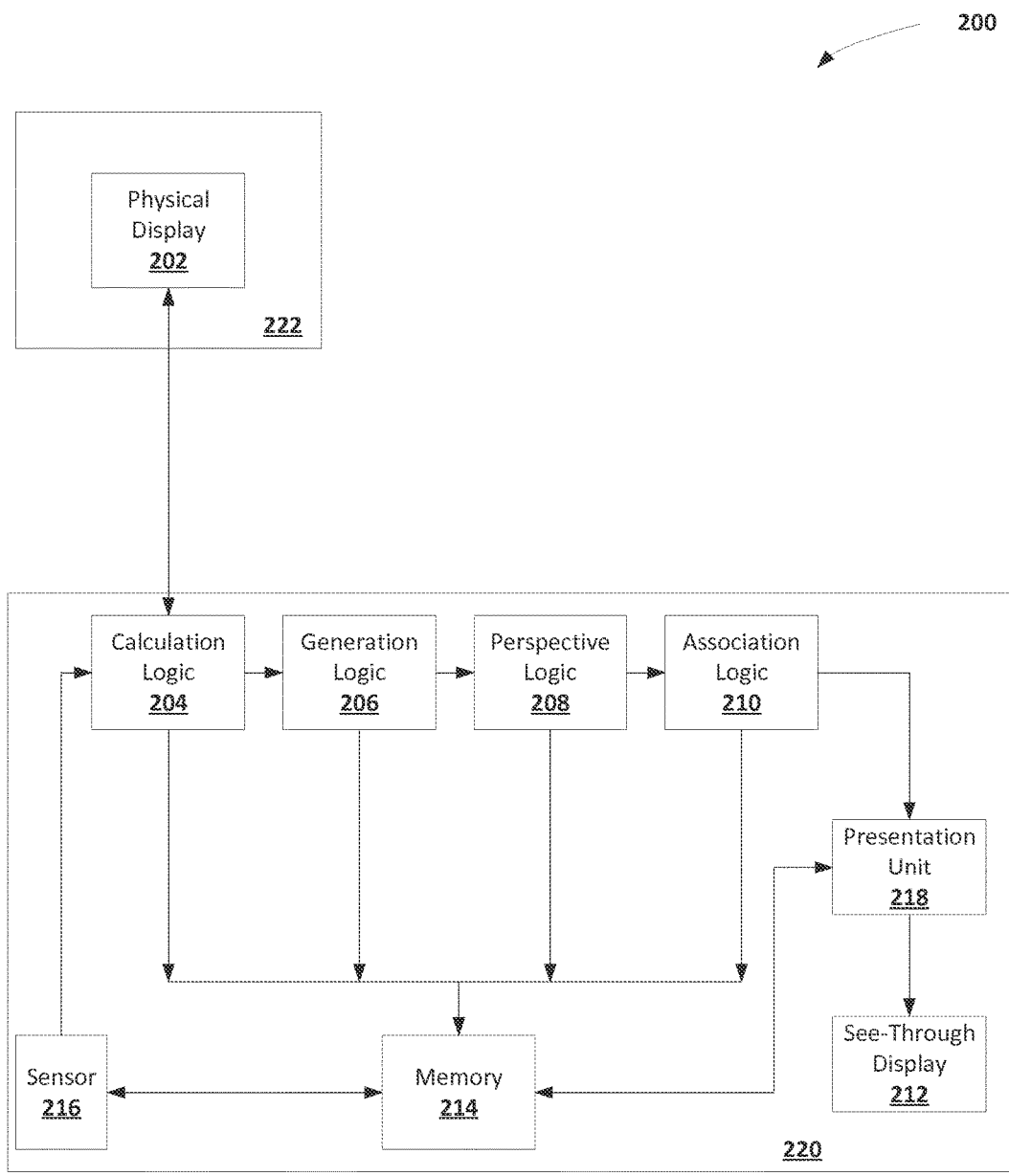
FIG. 2 illustrates, in a simplified schematic diagram, an exemplary multi-display system to implement the showing of computer-generated information to a user with at least one physical display and at least one virtual display that is provided by a head mounted display.

FIG. 2 illustrates, in a schematic diagram, an exemplary multi-display system 200 to implement the showing of computer-generated information to a user with at least one physical display and at least one virtual display that is provided by head mounted display 220.

Multi-display system 200 includes head mounted display 220 and computer system 222. Computer system 222 of FIG. 2 includes physical display 202. For the sake of simplicity, other elements of computer system 222 have not been shown. Physical display 202 is a physical display that is used to present computer-generated information of computer system 222.

Head mounted display 220 of FIG. 2 includes calculation logic 204 to determine a position of head mounted display 220, to determine a location of physical display 202 based on at least the determined position of head mounted display 220, to determine a surface position and a screen area of physical display 202 based on at least the determined location of physical display 202, and to provide the determine position of head mounted display 220, the determined location of physical display 202, the determined surface position of physical display 202, and the determined screen area of physical display 202 to generation logic 206.

Head mounted display 220 also includes generation logic 206, perspective logic 208, association logic 210, presentation unit 218, see-through display 212, memory 214, and sensor 216. For some embodiments, logic housing 109 of FIG. 1 is used to house at least one of calculation logic 204, generation logic 206, perspective logic 208, association logic 210, presentation unit 218, see-through display 212, memory 214, and sensor 216.

Returning to calculation logic 204 of FIG. 2, the position of head mounted display 220 and the location, surface position, and screen area of physical display 202 are determined using data and/or parameters obtained from sensor 216. For an embodiment, sensor 216 can be at least one of at least one of an accelerometer, a digital compass, a visual camera, an infra-red camera, and other physical sensor suitable for gathering data and/or measuring parameters relating to a physical manipulation and/or orientation context of head mounted display 220 and/or physical display 202.

For one embodiment, sensor 216 determines the position of head mounted display 220 and the location of physical display 202 by determining positional information of head mounted display 220 and determining positional information of physical display 202. The determining of the positional information includes determining a position of head mounted display 220, determining a viewpoint orientation of head mounted display 220 as determined by the visual perspective of a user of head mounted display 220, determining a plurality of vertices of the physical display using the determined position of head mounted display 220 and the determined viewpoint orientation of head mounted display 220, determining each distance between head mounted display 220 and each of the plurality of vertices using the determined plurality of vertices of the physical display, the determined position of head mounted display 220, and the determined viewpoint orientation of head mounted display 220. For yet other embodiments, the determining of positional information of head mounted display 220 also includes determining the location of physical display 202 in reference to the determined position of head mounted display 220.

For an embodiment, sensor 216 includes a position and orientation sensor that is used to measure the position of head mounted display 220, the viewpoint orientation of head mounted display 220, and the location of physical display 202 while head mounted display 220 is being worn by a user. The position and orientation sensor includes at least one of a gyro sensor, acceleration sensor, and magnetic sensor.

The gyro sensor detects rotations in three directions—X, Y, and Z—of head mounted display 220 and/or physical display 202 as measured by a planar coordinate system that approximates the real world. The acceleration sensor detects translational operations in the three X, Y, and Z directions of head mounted display 220 and/or physical display 202, and the magnetic sensor detects 3D position coordinates and viewpoint orientations of head mounted display 220 and/or physical display 202 using the X, Y, and Z directions of head mounted display 220. For some embodiment, these sensors output their measurement results to sensor 216 which sends the information to calculation logic 204. For these embodiments, calculation logic uses the measurements obtained by sensor 216 to determine the position and viewpoint orientation of head mounted display 220, as well as the location vertices of physical display 202.

For yet other embodiments, calculation logic uses the information obtained by sensor 216 to calculate each distance between each vertex of physical display 202 and head mounted display 220.

For some embodiments, the positional information of head mounted display 220 and physical display 202, as determined by sensor 216, are forwarded to calculation logic 204 of head mounted display 220. For another embodiment, sensor 216 can, in addition to determining the positional information of head mounted display 220 and physical display 202, also determine each angle between each of the vertices of physical display 202. For this embodiment, sensor 216 forwards, in addition to the positional information of head mounted display 220 and physical display 202, each angle between each of the vertices of physical display 202 to calculation logic 204. Calculation logic 204 uses the determined angles between each vertex of physical display 202 to modify each of the distances determined by sensor 216.

In addition to forwarding the positional information of head mounted display 220 and physical display 220 to calculation logic 204, sensor 216 also forwards the gathered data and/or parameters to memory 214 for storing. Memory 214 will be described in more detail below.

Returning to calculation logic 204 of FIG. 2, the positional information of head mounted display 220 and physical display 202 are used by calculation logic 204 to calculate a surface position and a screen area of physical display 202. For an embodiment, sensor 216 forwards the angles between each vertex of physical display 202, in addition to the positional information of head mounted display 220 and physical display 202, to calculation logic 204. For this embodiment, calculation logic 204 uses the angles between each vertex of physical display 202 to modify at least one of the surface position and screen area that are calculated by calculation logic 204.

The surface position refers to a plane where physical display 202 resides. That plane is a two-dimensional analogue of a three-dimensional real-world scene as it is viewed by a user wearing head mounted display 220. For an embodiment, the surface position calculated by calculation logic 204 is based on at least one of a three-dimensional Euclidean space, a two-dimensional Euclidean space, a two-dimensional Cartesian coordinate system, and a three-dimensional Cartesian coordinate system.

The screen area refers to the quantity that expresses the extent of physical display 202 in a plane that is a two-dimensional analogue of a three-dimensional real-world scene being viewed by a user wearing head mounted display 220. For one embodiment, the screen area is calculated based on at least one of three-dimensional formulae for determining the area of common shapes; two-dimensional formulae for determining the area of common shapes, and a division of physical display 202 into unit squares or unit triangles to determine its area. For yet other embodiments, if physical display 202 has a curved boundary, the screen area is calculated based on a division of physical display 202 into unit circles. It should be appreciated that the calculation of both the screen area and the surface position of physical display 202 are well known by those of ordinary skill in the art and thus, are not limited to the techniques described herein.

The positional information of head mounted display 220 and physical display 202, as well as the surface position and the screen area of physical display 202 are forwarded by calculation logic 204 to generation logic 206. In addition to forwarding the positional information of head mounted display 220 and physical display 220, as well as the surface position and screen area of physical display 202 to generation logic 206, calculation logic 204 also forwards the gathered and/or processed data to memory 214 for storing. Memory 214 will be described in more detail below.

At least one virtual display (such as virtual displays 107A-B of FIG. 1) is generated by generation logic 206 using the data received from calculation logic 204.

Generation logic 206 can be a graphics processing unit (GPU) or other circuitry that performs and executes graphics rendering. For one embodiment, generation logic 206 uses the positional information of head mounted display 220 and physical display 202, as well as the screen area and surface position of physical display 202, to perform the complex mathematical and geometric calculations that are necessary for graphics rendering. Furthermore, generation logic 206 uses the results of its calculations to render at least one virtual display (such as virtual displays 107A-B of FIG. 1). For example, and not by way of limitation, generation logic 206 is a GPU that uses the positional information, the screen area, and the surface position of physical display 202 to generate and render at least one virtual display that is a computer-graphics representation of physical display 202.

For one embodiment, a virtual display generated by generation logic 206 is based exclusively on the positional information of head mounted display 220 and physical display 202, as determined by sensor 216 and calculation logic 204 (described above). For other embodiments, generation unit 206 includes eye-tracking sensors (not shown) to measure and track a user's eye movements so that his visual perspective can be determined. The data obtained from the eye-tracking sensors can be used by generation logic 206, in conjunction with data gathered and/or processed by calculation unit 204, to generate at least one virtual display that will be presented to a user of head mounted display 220 based on that individual user's visual perspective. The eye-tracking sensors can be based on eye-attached tracking, such as a special contact lens with an embedded mirror or magnetic field sensor, or on optical eye-tracking, such as pupil center corneal reflection techniques. It should be appreciated that the techniques of calculating and/or tracking a user's eye movements to determine that user's visual perspective are well known by those of ordinary skill in the art and thus, are not limited to the techniques described herein.

Figure 4:
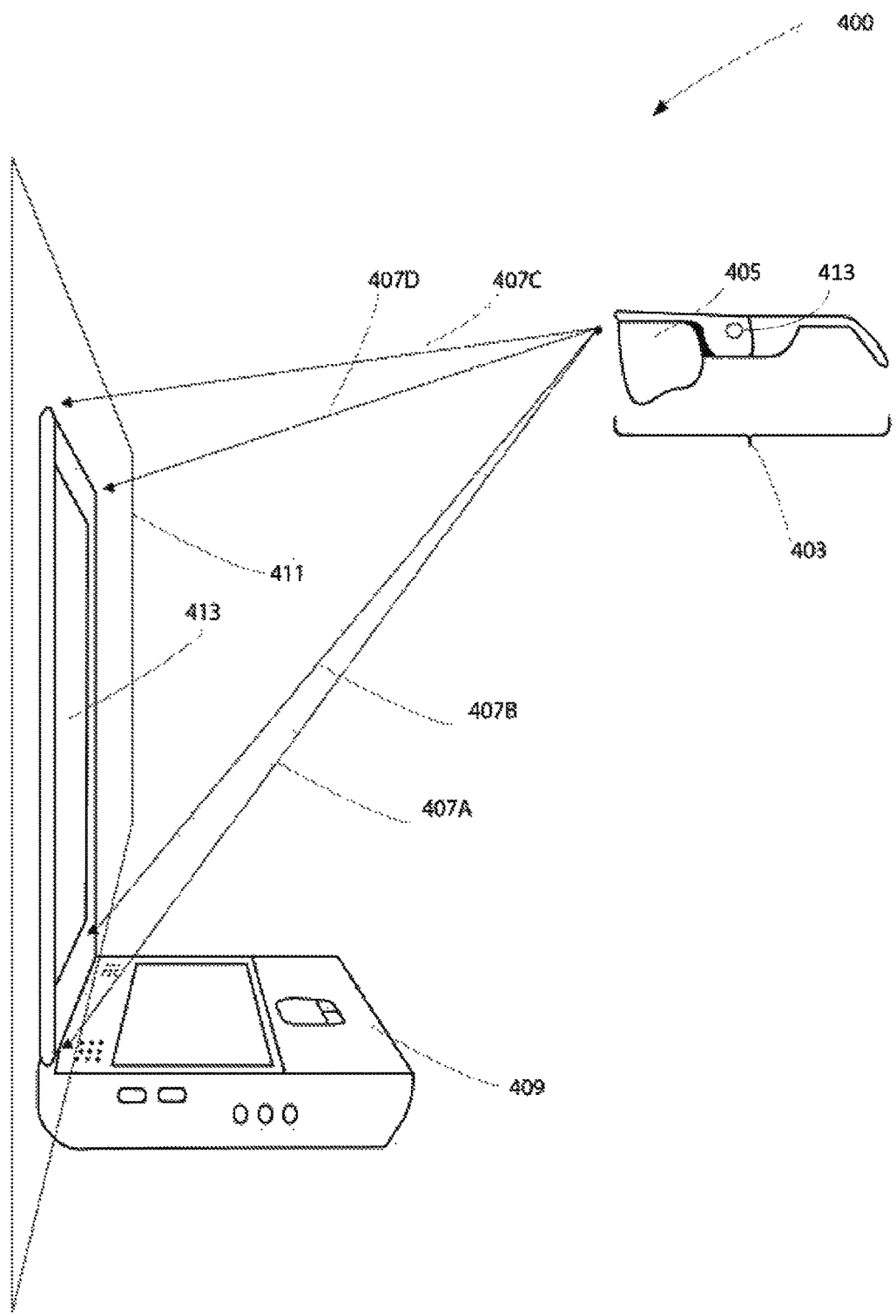
FIG. 4 is an illustration of an exemplary multi-display system with at least one physical display and at least one virtual display that is provided by a head mounted display.

For some embodiments, generation logic 206 generates a virtual display that has a screen area that is a multiple of the screen area of physical display 202 based on the measurements of eye-tracking sensors and/or the data gathered and/or processed by calculation unit 204. FIG. 4 shows an exemplary representation of a virtual display having a screen area that is a multiple of a screen area of a physical display that was generated by a generation logic (such as generation logic 206 of FIG. 2).

FIG. 4 is an illustration of an exemplary multi-display system 400 with one physical display 413 and one virtual display 411 provided by a head mounted display 403. Multi-display system 400 includes computer system 409 having physical display 413, and head mounted display 403 presenting virtual display 411. A user that is looking at physical display 413 of computer system 409, while wearing head mounted display 403, is presented with virtual display 411. Virtual display 411 is presented by a presentation unit (not shown) on see-through display 405 of head mounted display 403 to the user wearing head mounted display 403 after generation logic 413 generates virtual display 411. Virtual display 411 is generated by generation logic 405 based on data acquired by a calculation unit (not shown), and at least one sensor (not shown). For one embodiment, the calculation unit and the at least sensor determine each of four distances 407A-D between head mounted display 403 and physical display 413. The calculation unit and the at least one sensor use distances 407A-D to calculate a position of head mounted display 403, a location of physical display 413, a surface position of physical display 413, and a screen area of physical display 413. For other embodiments, the generated virtual display 411 is generated by generation unit 413 using at least one of the pieces of data gathered and/or calculated by the calculation unit and the at least one sensor, as described above. For example, and not by way of limitation, if the screen area of physical display 413 is 540 cm$^2$ or 83.7 square inches, then virtual display 411 will be generated by generation unit 413 to have a screen area of 1080 cm$^2$ or 167.4 square inches (which is achieved by multiplying the exemplary screen area of physical display 413 by a multiple of 2).

Returning to FIG. 2, the generated virtual display of generation logic 206 is sent to perspective logic 208. In addition to forwarding the generated virtual display of head mounted display 220 to perspective logic 208, generation logic 206 also forwards the generated virtual display to memory 214 for storing. Memory 214 will be described in more detail below.

Perspective logic 208 determines a desired relative display orientation between first and second portions of an extended desktop to be assigned to physical display 202 and the generated virtual display. The desired relative display orientation of an extended desktop is determined because a user wearing head mounted display 220 will move his head, or change his location.

This relative display orientation can allow a user of multi-system 200 to view computer-generated information in an extended desktop of physical display 202 and at least one virtual display comfortably. For one embodiment, the relative display orientation is determined by perspective logic 208 using the positional information of head mounted display 220, the positional information of physical display 202, the surface position of physical display 202, and the screen area of physical display 202, as determined by sensor 216 and calculation logic 204 (described above). The relative display orientation is used to determine the location of physical display 202 in the real world relative to the real-world location of the at least one virtual display that is generated by generation logic 206. This relative display orientation allows the head mounted display 220 and the physical display 202 to present computer-generated information to a user using an extended desktop.

For yet other embodiments, perspective logic 208 includes a physical sensor, for example, an accelerometer, a digital compass, a visual camera, an infra-red camera, or other physical sensor suitable for gathering data and/or measuring parameters relating to a physical manipulation and/or orientation context of head mounted display 220 and/or physical display 202. For these embodiments, the physical sensor is used to provide an indication of a desired relative display orientation between first and second portions of an extended desktop to be assigned to physical display 202 and the generated virtual display. The indication is based on data gathered by the physical sensor in response to at least one of a tilting, a movement, and a rotation of head mounted display 220 and/or physical display 202.

Perspective logic 208 forwards the desired relative display orientation to association logic 210. In addition to forwarding the desired relative display orientation to association logic 210, perspective logic 208 also forwards the desired relative display orientation to memory 214 for storing. Memory 214 will be described in more detail below.

Association logic 210 configures the first and second portions of the extended desktop that is to be presented on physical display 202 and the at least one virtual display generated by generation logic 206. For one embodiment, the configuration includes the desired relative display orientation, and the extended desktop is jointly provided on physical display 202 and the generated virtual display of generation logic 206 simultaneously. For another embodiment, the extended desktop is provided first on physical display 202 and then extended onto the generated virtual display of generation logic 206.

After the configuration of the extended display on physical display 202 and the generated virtual display by association logic 210, all the data and/or parameters that have been gathered and/or processed by calculation logic 204, generation logic 206, perspective logic 208, and association logic 210 are forwarded to presentation unit 218 and to memory 214 for storing. Memory 214 will be described in more detail below.

Presentation unit 218 can be hardware, or software, or a combination thereof. Presentation unit 218 is used to coalesce the data gathered and/or obtained by the other logical units of FIG. 2, and to create the final visual representation of the virtual display(s) and the computer-generated information from the coalesced data. The final visual representation of the virtual display(s) and the computer-generated information that is created by presentation unit 218 is presented to a user of head mounted display 105 on see-through display 220.

For example, and not by way of limitation, presentation unit 218 can be a projector that projects at least one visual display on a see-through display 212 that is made of a lens or a piece of glass, plastic, or other transparent substance that is placed directly on or in front of a human eye, and is used for concentrating, modifying, projecting, or dispersing light rays. For the previous example, the projected virtual display is generated by generation logic 206, and configured with a relative display orientation by perspective logic 208 and association logic 210.

For an additional non-limiting example, presentation unit 218 can be a display controller that processes at least one of the virtual displays that are generated by generation logic 206, and outputs the processed results using a see-through display 212, such as a virtual retinal display (VRD), a retinal scan display (RSD) or a retinal projector (RP), to present at least one of the generated virtual displays of generation logic 206 directly onto the retina of the eye of a user of head mounted display 220.

For another non-limiting example, presentation unit 218 can be a video display controller (VDC) that processes the generated virtual displays of generation logic 206, as well as the relative display orientation of perspective logic 208 and association logic 210, and uses the processed results to output frame buffers on see-through display 212 so that a user of head mounted display 220 is presented with a visual representation of the virtual displays and the computer-generated information. For yet another non-limiting example, presentation unit 218 can be a video display processor (VDP) that processes the generated virtual displays of generation logic 206, as well as the relative display orientation of perspective logic 208 and association logic 210, and uses the processed results uses to output a visual representation of the visual displays and the computer-generated information to be shown to a user of head mounted display 220 on see-through display 212. For an alternative example, presentation unit 218 can be a video signal generator that outputs the visual representation of at least one of virtual displays that have been generated and processed by at least one of generation logic 206, perspective logic 208, and association logic 210 to see-through display 212 for presentation of at least one virtual display and computer-information to a user of head mounted display 220.

The output from presentation unit 218 is forwarded to see-through display 212 for presentation of at least one generated virtual display of generation logic 206 to a user of head mounted display 220. Furthermore, the output of presentation unit 218 is also forwarded to memory 214 for storing. Memory 214 will be described in more detail below.

The output of presentation unit 218 that is presented on see-through display 212 shows at least one of the generated virtual displays of generation logic 206. For some embodiments, at least one of the generated virtual displays of generation logic 206 is configured to act in concert with physical display 202 as an extended desktop. For one embodiment, at least one of the generated virtual displays of generation logic 206 is presented, by presentation unit 218, on see-through display 212 based on the configured relative display orientation of the first and second portions of the extended desktop that were determined by perspective logic 208 and association logic 210, respectively.

For some embodiments, at least one of the generated virtual displays of generation unit 206 is presented, by presentation unit 218, on see-through display 212 to the user wearing head mounted display 220 as an additional object in a real-world scene being perceived by the user. For example, the generated virtual display of generation logic 206 can be presented, by presentation unit 218, on see-through unit 212 as an additional object that is adjacently located to physical display 202 in the real-world scene. Alternatively, the generated virtual display of generation logic 206 can be presented, by presentation unit 218, on see-through display 212 as an additional object that is superimposed over physical display 202 in the real-world scene. For yet other embodiments, the computer-generated information is shown in an extended desktop that spans the generated virtual display of generation logic 206 and physical display 202 only while physical display 202 is in the field of view of head mounted display 220, as described above.

For an embodiment, memory 214 is used to store all the data gathered and/or processed by sensor 216, calculation logic 204, generation logic 206, perspective logic 208, association logic 210, and see-through display 212.

For another embodiment, the computer-generated information that is shown in an extended desktop to a user is stored in memory 214 of head mounted display 220. The computer-generated information stored by memory 214 is presented, by presentation unit 218, exclusively in the at least one virtual display that was generated by generation logic 206 (such as virtual displays 107A-B of FIG. 1) only if physical display 202 is not in a field of view of head mounted display 220, as described above. For example, and not by way of limitation, if a user of head mounted display 220, who is looking at an extended desktop made up of physical display 220 and a virtual display being presented on see-through display 212, moves his head so that physical display 202 is no longer in his field of vision as determined by at least one physical sensor, then the information stored in memory 214 will be presented, by presentation unit 218, only in the virtual display being presented on see-through display 212. An advantage of memory 214 is that it allows a user using head mounted display 220 to continue viewing the computer-generated information in the extended desktop even after the removal of physical display 202 from the field of vision of head mounted display 220.

Calculation logic 204 of head mounted display 220 can optionally re-determine the positional information of head mounted display 220, the positional information of physical display 202, the surface position of physical display 202, and the screen area of physical display 202. The re-determination can be performed in response to at least one of a physical movement of physical display 202, a physical movement of head mounted display 220, and an amount of time elapsed from at least one of a previous determination of the positional information of head mounted display 220, a previous determination of the location of physical display 202, a previous determination of the surface position of physical display 202, and a previous determination screen area of physical display 202.

For some embodiments, the physical movement of head mounted display 220 and/or physical display 202 includes at least one of a tilting, rotating, or moving of head mounted display 220 and/or physical display 202. For these embodiments, the determination of a physical movement of at least one of physical display 202 and head mounted display 220 can be based on a determination by at least one of an accelerometer, a digital compass, a visual camera, an infrared camera, a gyro sensor, a magnetic sensor, or an acceleration sensor, and other physical sensor suitable for gathering data and/or measuring parameters relating to a physical manipulation and/or orientation context of head mounted display 220 and/or physical display 202. For some embodiments, the re-determination of the positional information of head mounted display 220 and physical display 202, the surface position of physical display 202, and the screen area of physical display 202 can be based on data and/or parameters measured by sensor 216, as described above. For this embodiment, sensor 216 can re-determine the position of head mounted display 220 and the location of physical display 202 based on the re-determined position of head mounted display 220 by re-determining positional information of head mounted display 220 and re-determining positional information of physical display 202.

The re-determining of the positional information includes re-determining a position of head mounted display 220, re-determining a viewpoint orientation of head mounted display 220 as determined by the visual perspective of a user of head mounted display 220, re-determining a plurality of vertices of the physical display using the re-determined position of head mounted display 220 and the viewpoint orientation of head mounted display 220, re-determining each distance between head mounted display 220 and each of the plurality of vertices using the re-determined plurality of vertices of the physical display, the re-determined position of head mounted display 220, and the re-determined viewpoint orientation of head mounted display 220. For yet other embodiments, the re-determining of positional information of head mounted display 220 also includes re-determining the location of physical display 202 in reference to the re-determined position of head mounted display 220.

Figure 3A:
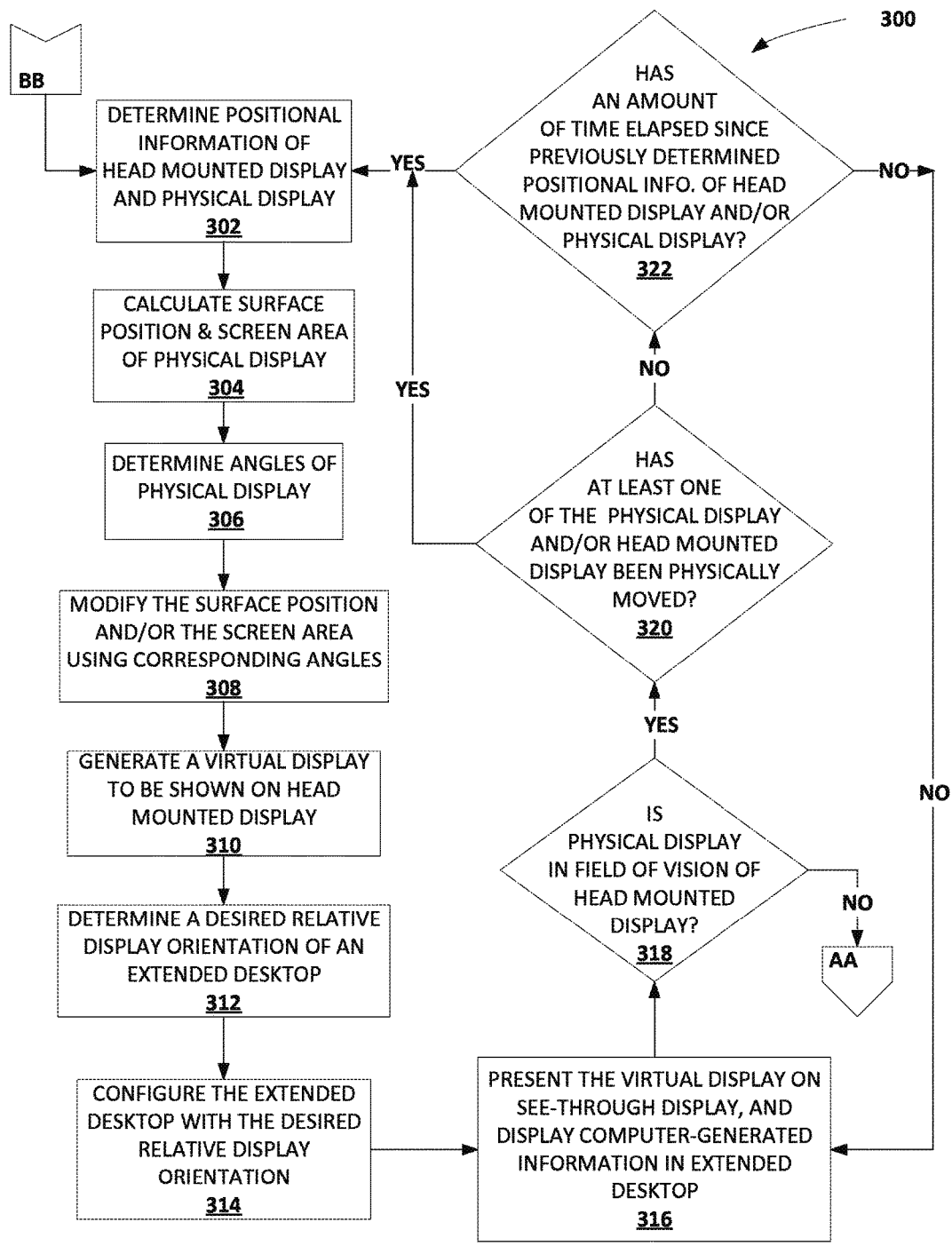
FIG. 3A is a flow chart illustrating an exemplary method of showing computer-generated information to a user with a multi-display system that includes at least one physical display and at least one virtual display that is provided by a head mounted display.
Figure 3B:
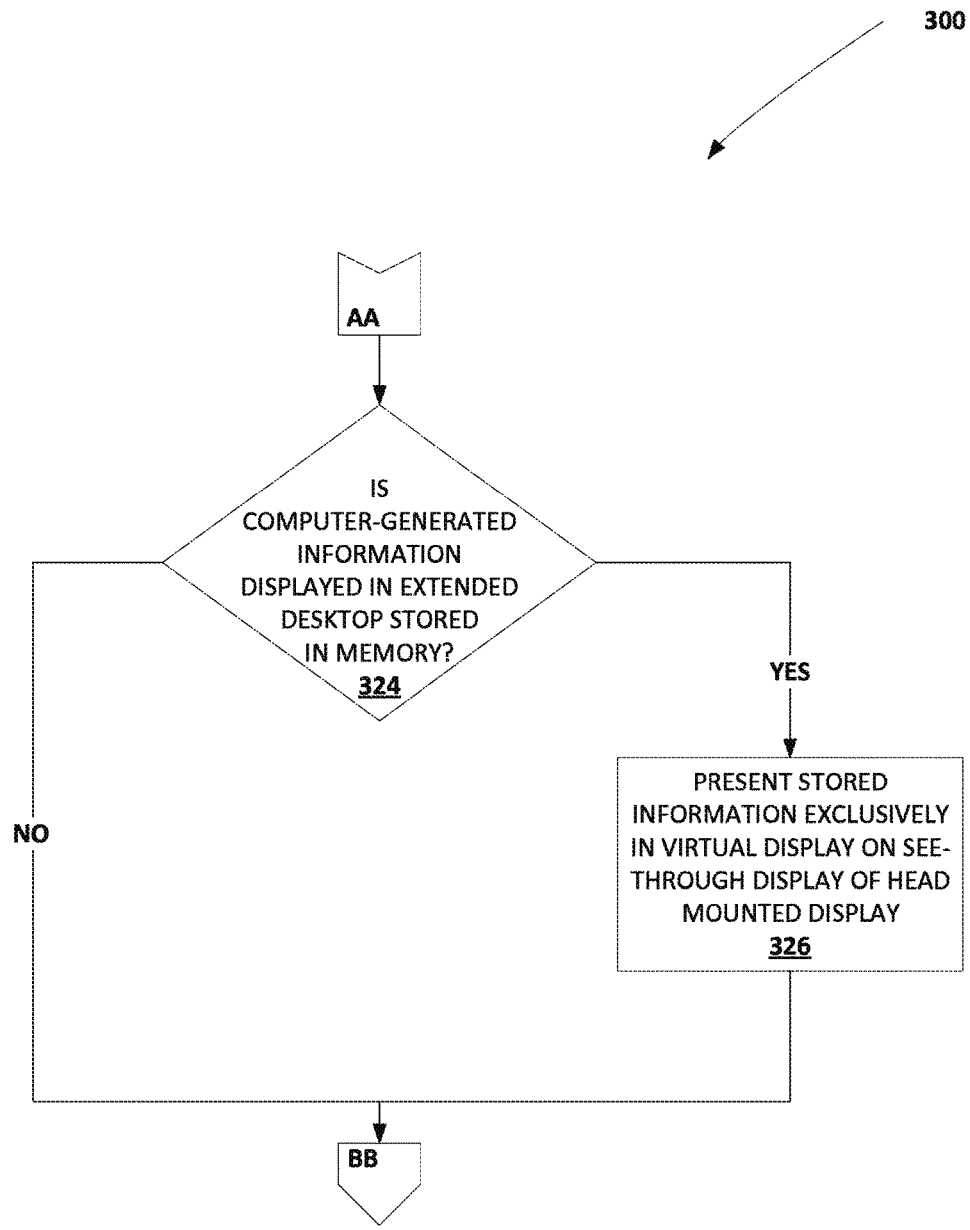
FIG. 3B is a flow chart illustrating additional features of the method of showing computer-generated information to a user with a multi-display system that includes at least one physical display and at least one virtual display that is provided by a head mounted display.

FIG. 3A and FIG. 3B illustrate method 300 of showing computer-generated information to a user with a multi-display system (such as multi-display system 100 of FIG. 1) that includes at least one physical display (such as physical display 103 of FIG. 1) and at least one virtual display (such as virtual displays 107A-B of FIG. 1) that is provided by a head mounted display (such as head mounted display 105 of FIG. 1). For example, computer-generated information is presented to a user using physical display 103 and virtual displays 107A-B working together as an extended desktop. The computer-generated information that is shown can be audio or visual output (e.g., sound, text, graphics, video, etc.) or any other types of information that can be presented to users on computing systems with which a user can interact.

In FIG. 3A, at block 302, head mounted display 105 determines positional information of head mounted display 105 and positional information of physical display 103. For an embodiment, the determination of positional information of head mounted display 105 and physical display 103 is performed by sensor 216 and calculation logic 204 of FIG. 2, as described above.

At block 304 of FIG. 3A, head mounted display 105 calculates the location, the surface position, and the screen area of physical display 103. For one embodiment, the calculation of the location, the surface position, and the screen area of physical display 103 are performed by sensor 216 and calculation logic 204 of FIG. 2, as described above.

At block 306 of FIG. 3A, head mounted display 105 optionally determines each angle between each vertex of physical display 103. For an embodiment, the determination of the angles of physical display 103 is performed by sensor 216 of FIG. 2, as described above.

At block 308 of FIG. 3A, head mounted display 105 optionally modifies the surface position and/or screen area that was calculated in block 304 with the angles that were determined in block 306. For example, the angles may serve as multipliers or other weighting value for each of the corresponding distance values between each vertex of physical display 103 and head mounted display 105. The modification is performed to create modified distance values to represent each of the distances between each vertex of physical display 103 and head mounted display 105. These modified distance values are then used to calculate a modified screen area and/or a modified surface position of physical display 103 in combination with each of the vertices of physical display 103. For one embodiment, the modification of at least one of the surface position and the screen area of physical display 103 is performed by calculation logic 204 of FIG. 2, as described above.

At block 310 of FIG. 3A, head mounted display 105 generates at least one virtual display 107A-B to be shown on head mounted display 105 to the user. For an embodiment, the virtual displays 107A-B are generated based on the positional information of head mounted display 105, the positional information of physical display 103, the surface position of physical display 103, and the screen area of physical display 103 as determined in blocks 302-308 of FIG. 3A.

For another embodiment, virtual displays 107A-B are generated by head mounted display 105 based on data obtained from eye-tracking sensors, in conjunction with data gathered and/or processed in blocks 302-308 of FIG. 3A. An advantage of generating virtual displays 107A-B based on at least some eye-tracking data enables the presentation of at least one virtual display 107A-B to a user of head mounted display 105 based on that individual user's visual perspective. The eye-tracking sensors can be based on eye-attached tracking, such as a special contact lens with an embedded mirror or magnetic field sensor, or on optical eye-tracking, such as pupil center corneal reflection techniques. It should be appreciated that the techniques of calculating and/or tracking a user's eye movements to determine that user's visual perspective are well known by those of ordinary skill in the art and thus, are not limited to the techniques described herein.

For other exemplary embodiments, virtual displays 107A-B have a screen area that is a multiple of the screen area of physical display 103, and a surface position that is a multiple of the surface position of physical display 103. For some embodiments, the generation of virtual displays 107A-B is performed by generation logic 206 of FIG. 2, as described above.

Head mounted display 105 determines, at block 312 of FIG. 3A, a desired relative display orientation between first and second portions of an extended desktop to be assigned to physical display 103 and generated virtual displays 107A-B. For one embodiment, the desired relative display orientation is based on the positional information of head mounted display 105, the positional information of physical display 103, the surface position of physical display 103, and the screen area of physical display 103 as determined in blocks 302-308 of FIG. 3A. For another embodiment, the desired relative display orientation is determined by perspective logic 208 of FIG. 2, as described above.

At block 314 of FIG. 3A, head mounted display 105 configures an extended desktop with the desired relative display orientation that was determined in block 312 of FIG. 3A. For one embodiment, the configuration is performed automatically in response to the determination of the desired relative display orientation. For other embodiments, the extended desktop is configured to jointly provide computer-generated information on physical display 103 and virtual displays 107A-B at the same time. The configuration of the extended desktop on physical display 103 and virtual displays 107A-B can be performed, for example, by association logic 210 of FIG. 2, as described above.

Head mounted display 105 presents, at block 316 of FIG. 3A, at least one virtual display 107A-B to a user wearing head mounted display 105. Virtual displays 107A-B are presented, on a see-through display of head mounted display 105, as additional objects in a real-world scene that is being viewed by the user wearing head mounted display 105. Furthermore, at block 316 of FIG. 3A, head mounted display 105 also presents computer-generated information in the extended desktop that was determined and configured in blocks 312 and 314, respectively. For an embodiment, virtual displays 107A-B appear, to the user, to be intermixed in the real-world scene that is seen by the user while he is looking through a see-through display of head mounted display 105. For another embodiment, virtual displays 107A-B appear, to the user, to be adjacently located next to physical display 103 in the real-world scene. For example, virtual displays 107A-B appear to the user as screens that are located to the left of physical display 103. For another example, virtual displays 107A-B appear to the user as screens that are located to the right of physical display 103. In yet another example, virtual displays 107A-B appear to the user as screens that are located to the bottom of physical display 103. For yet another example, virtual displays 107A-B appear to the user as screens that are located to the top of physical display 103. For an additional example, virtual displays 107A-B appear to the user as screens that are located to at least one of the left of physical display 103, the right of physical display 103, the top of physical display 103, the bottom of physical display 103, and any other combination or variation thereof.

For other embodiments, virtual displays 107 A-B appear, to the user, to be superimposed over physical display 103 such that the information on virtual displays 107A-B and physical display 103 are seen by the user simultaneously. For example, virtual displays 107A-B appear to the user as screens that are overlayed on physical display 103. FIG. 4 (described above) provides an exemplary embodiment that shows a virtual display (such as virtual display 411) that is superimposed over a physical display (such as physical display 413). For some embodiments, the presentation of at least one virtual display 107A-B to a user of head mounted display 105 can be performed, for example, using see-through display 212 of FIG. 2, as described above.

Returning to FIG. 3A, at block 318, head mounted display 105 determines if physical display 103 is in a field of vision of head mounted display 105. If physical display 103 is not in a field of vision of head mounted display 105, method 300 moves to block 324 of FIG. 3B (described below). If physical display 103 is in a field of vision of head mounted display 105, at block 320, head mounted display 105 determines if at least one of the head mounted display 105 and physical display 103 has been subject to a physical movement. For some embodiments, the determination of a physical movement of at least one of physical display 103 and head mounted display 105 can be based on a determination by at least one of an accelerometer, a digital compass, a visual camera, an infra-red camera, a gyro sensor, a magnetic sensor, or an acceleration sensor, and other physical sensor suitable for gathering data and/or measuring parameters relating to a physical manipulation and/or orientation context of head mounted display 105 and/or physical display 103. For other embodiments, the determination that a physical movement of at least one of physical display 103 and head mounted display 105 has occurred can be based on data that is gathered by sensor 216 of FIG. 2, as described above.

If, at block 320 of FIG. 3A, method 300 determines that a physical movement of at least one of physical display 103 and head mounted display 105 has occurred, then method 300 proceeds to block 302 to re-determine positional information of physical display 103 and head mounted display 105, as described above. For some embodiments, the re-determination of positional information is performed by sensor 216 and calculation logic 204 of FIG. 2, as described above. If, at block 320 of FIG. 3A, method 300 determines that there has been no physical movement of physical display 103 or head mounted display 105, then method 300 proceeds to block 322 of FIG. 3A (described below).

At block 322 of FIG. 3A, head mounted display 105 determines whether a pre-determined amount of time has elapsed since the previous determination of at least one of the positional information of physical display 103 and the positional information of head mounted display 105. If the pre-determined amount of time has elapsed, then method 300 returns to block 302 of FIG. 3 to re-determine positional information of physical display 103 and head mounted display 105, as described above. For some embodiments, the re-determination of positional information is performed by sensor 216 and calculation logic 204 of FIG. 2, as described above. For other embodiments, the head mounted display 105 can include timer logic (not shown) which is used store the predetermined time period and to cause the calculation logic (such as calculation logic 204 of FIG. 2) to re-determine positional information of physical display 103 and head mounted display 105, as described above.

If, at block 322 of FIG. 3A, the pre-determined amount of time has not elapsed, then method 300 returns to block 316 of FIG. 3A to continue presenting computer-generated information in an extended desktop using at least one virtual display 107A-B and at least one physical display 103, as described above.

As alluded to above, if physical display 103 is not in a field of vision of head mounted display 105, method 300 moves to block 324 of FIG. 3B. At block 324, head mounted display 105 determines if the computer-generated information that is presented in an extended desktop is stored in a memory (such as memory 214 of FIG. 2).

If the computer-generated information being shown in an extended desktop is stored in a memory, method 300 can optionally continue to block 326 of FIG. 3B. At block 326, head mounted display 105 presents the stored information exclusively in virtual displays 107A-B of head mounted display 105.

If the computer-generated information being shown in an extended desktop is not stored in a memory, or if head mounted display 105 displays the stored information exclusively in virtual displays 107A-B, then method 300 returns to block 302 of FIG. 3A to begin determining the positional information of physical display 103 and head mounted display 105, as described above.

Figure 5:
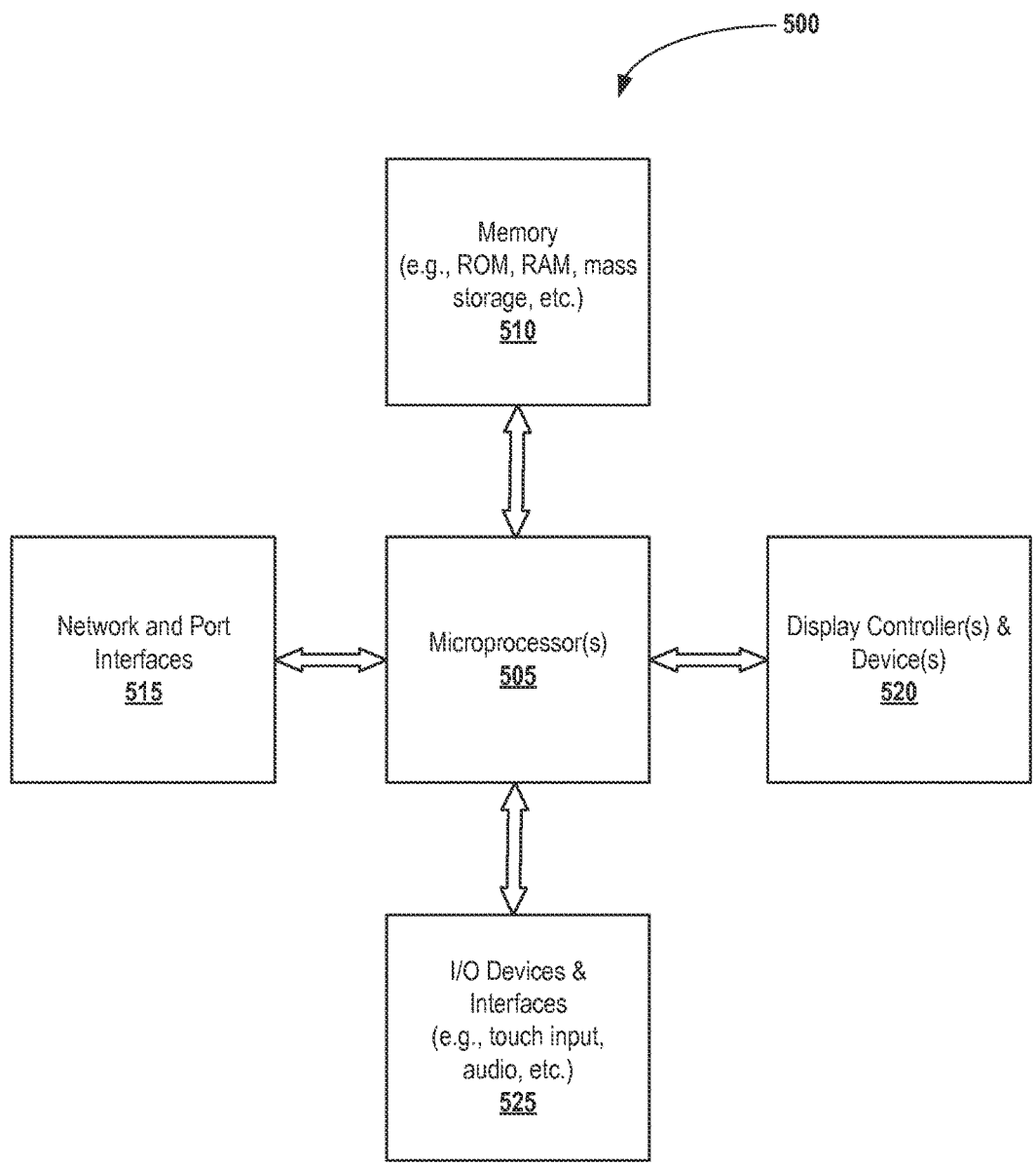
FIG. 5 illustrates, in block diagram form, an exemplary processing system to implement the method of showing computer-generated information to a user with a multi-display system that includes at least one physical display and at least one virtual display that is provided by a head mounted display.

FIG. 5 illustrates, in block diagram form, an exemplary processing system to implement the method of showing computer-generated information to a user with a multi-display system that includes at least one physical display and at least one virtual display.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as RAM, ROM, SSD, Flash, PCM, or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices. It will be appreciated that one or more buses, may be used to interconnect the various components shown in FIG. 5.

Data processing system 500 is an exemplary representation of one or more of the multi-display system that provides an extended desktop to a user with at least one physical display and at least one virtual display. An exemplary data processing system 500 is multi-display system 100 of FIG. 1 or multi-display system 400 of FIG. 4, computer system 101 of FIG. 1, computer system 409 of FIG. 4, head mounted display 105 of FIG. 1, and head mounted display 403 of FIG. 4. Data processing system 500 may be a video head mounted display, an optical head mounted display, a desktop computer, a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, computer system, and "apparatus comprising a processing device" may be used interchangeably with data processing system 500 and include the above-listed exemplary embodiments.

Additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented method 300 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, reference has been made to specific embodiments of a system and method of providing an extended display with a head mounted display. The description above and drawings are illustrative of a system and method of providing an extended display with a head mounted display, and are not to be construed as limiting the system and method of providing an extended display with a head mounted display. It will be evident that various modifications may be made thereto without departing from the broader spirit and scope of the system and method of providing an extended display with a head mounted display.

What is claimed is:

1. A head mounted display (HMD), comprising:
a generation logic to generate at least one virtual display;
a see-through display; and
a presentation unit to present the at least one virtual display on the see-through display; and
a memory coupled to the presentation unit,
wherein the see-through display is configured to enable a user to view the at least one virtual display and a physical display in a real-world scene,
wherein the at least one virtual display is presented on the see-through display as an additional object in the real-world scene, and
wherein the at least one virtual display is used in conjunction with the physical display to present a first computer-generated information in a first extended desktop from a visual perspective of the user, the first extended desktop comprising a first portion assigned to the physical display and a second portion assigned to the at least one virtual display, wherein the presentation unit is configured to determine if the physical display is in a field of vision of the HMD; and wherein the presentation unit is configured to present the first computer-generated information that has been previously stored in the memory in a second extended desktop comprising a third portion assigned to the at least one virtual display that represents the first portion, if the physical display is not in the field of vision of the HMD to continue viewing the first computer-generated information after the removal of physical display from the field of vision.

2. The HMD of claim 1, wherein the first computer-generated information is presented in the first extended desktop while the physical display is in the field of vision of the HMD.

3. The HMD of claim 1, further comprising:
a calculation logic to
   determine a position of the head mounted display;
   determine a location of the physical display based on at least the determined position of the head mounted display;
   determine a surface position and a screen area of the physical display based on at least the determined location of the physical display; and
provide the determined position of the head mounted display, the determined location of the physical display, the determined surface position of the physical display, and the determined screen area of the physical display to the generation logic.

4. The HMD of claim 3, further comprising:
the calculation logic to re-determine the position of the head mounted display, the location of the physical display, the surface position of the physical display, and the screen area of the physical display in response to at least one of
   a physical movement of the physical display,
   a physical movement of the HMD, and
   an amount of time elapsed from at least one of a previous determination of the position of the HMD, a previous determination of the location of the physical display, a previous determination of the surface position of the physical display, and a previous determination screen area of the physical display.

5. The HMD of claim 3, wherein the generation logic generates the at least one virtual display with a screen area that is a multiple of the screen area of the physical display, wherein eye-tracking data is gathered by at least one eye-tracking sensor, and wherein the generation logic generates the at least one virtual display based on at least one of
   the gathered eye-tracking data,
   the determined position of the head mounted display,
   the determined location of the physical display,
   the determined surface position of the physical display, and
   the determined screen area of the physical display.

6. The HMD of claim 1, further comprising:
a perspective logic to determine a desired relative display orientation between the first portion and the second portion; and
an association logic to configure the first portion and the second portion of the first extended desktop with the desired relative display orientation, wherein the at least one virtual display is used in conjunction with the physical display to present the configured first portion and the configured second portion of the first extended desktop from a visual perspective of the user.

7. The HMD of claim 1, wherein the at least one virtual display is presented on the see-through display as an additional object that is adjacently located to the physical display in the real-world scene from a visual perspective of the user.

8. The HMD of claim 1, wherein the at least one virtual display is presented on the see-through display as an additional object that is superimposed over the physical display in the real-world scene from a visual perspective of the user.

9. A computer-implemented method, comprising:
generating, with a Head Mounted Display (HMD), at least one virtual display;
presenting the at least one virtual display on the HMD, wherein the HMD is configured to enable a user to view the at least one virtual display and a physical display in a real-world scene, wherein the at least one virtual display is presented on the HMD as an additional object in the real-world scene, and wherein the at least one virtual display is used in conjunction with the physical display to present a first computer-generated information in a first extended desktop from a visual perspective of the user, the first extended desktop comprising a first portion assigned to the physical display and a second portion assigned to the at least one virtual display;
determining if the physical display is in a field of vision of the HMD; and
presenting the first computer-generated information in a second extended desktop comprising a third portion assigned to the at least one virtual display that represents the first portion, if the physical display is not in the field of vision of the HMD to continue viewing the first computer-generated information after the removal of physical display from the field of vision.

10. The computer-implemented method of claim 9, wherein the first computer-generated information is presented in the first extended desktop while the physical display is in a field of vision of the HMD.

11. The computer-implemented method of claim 9, further comprising:
determining a position of the head mounted display;
determining a location of the physical display based on at least the determined position of the head mounted display;
determining a surface position and a screen area of the physical display based on at least the determined location of the physical display; and
providing the determined position of the head mounted display, the determined location of the physical display, the determined surface position of the physical display, and the determined screen area of the physical display to the HMD.

12. The computer-implemented method of claim 11, further comprising:
re-determining the position of the head mounted display, the location of the physical display, the surface position of the physical display, and the screen area of the physical display in response to at least one of
   a physical movement of the physical display,
   a physical movement of the HMD, and
   an amount of time elapsed from at least one of a previous determination of the position of the HIVID, a previous determination of the location of the physical display, a previous determination of the surface position of the physical display, and a previous determination screen area of the physical display.

13. The computer-implemented method of claim 11, wherein the determining the location of the physical display further includes determining each angle between each vertex of the physical display, and wherein at least one of the surface position and the screen area of the physical display is modified using the determined angles.

14. The computer-implemented method of claim 11, wherein the generating includes generating the at least one virtual display with a screen area that is a multiple of the screen area of the physical display, wherein the generating includes gathering eye-tracking data, and wherein the generating includes generating the at least one virtual display based on at least one of the gathered eye-tracking data,
   the determined position of the head mounted display,
   the determined location of the physical display,
   the determined surface position of the physical display, and
   the determined screen area of the physical display.

15. The computer-implemented method of claim 9, further comprising:
- determining a desired relative display orientation between the first portion and the second portion; and
- configuring the first portion and the second portion of the first extended desktop with the desired relative display orientation, wherein the at least one virtual display is used in conjunction with the physical display to present the configured first portion and the configured second portion of the first extended desktop from a visual perspective of the user.

16. The computer-implemented method of claim 9, wherein the at least one virtual display is presented on the HMD as an additional object that is adjacently located to the physical display in the real-world scene from a visual perspective of the user.

17. The computer-implemented method of claim 9, wherein the at least one virtual display is presented on the HMD as an additional object that is superimposed over the physical display in the real-world scene from a visual perspective of the user.

18. A multi-display system, comprising:
- a physical display, wherein the physical display is used to present computer-generated information to a user;
- a generation logic to generate a virtual display; and
- a Head Mounted Display (HMD), the HMD comprising:
  - a see-through display; and
  - a presentation unit to present the at least one virtual display on the see-through display, wherein the see-through display is configured to enable the user to view the at least one virtual display and the physical display in a real-world scene, wherein the at least one virtual display is presented on the see-through display as an additional object in the real-world scene, and wherein the at least one virtual display is used in conjunction with the physical display to present a first computer-generated information in a first extended desktop from a visual perspective of the user, the first extended desktop comprising a first portion assigned to the physical display and a second portion assigned to the at least one virtual display, wherein the presentation unit is configured to determine if the physical display is in a field of vision of the HMD; and wherein the presentation unit is configured to present the first computer-generated information that has been previously stored in the memory in a second extended desktop comprising a third portion assigned to the at least one virtual display that represents the first portion, if the physical display is not in the field of vision of the HMD to continue viewing the first computer-generated information after the removal of physical display from the field of vision.

* * * * *